Jan. 19, 1960 J. S. MURRAY 2,921,985

COMBINED LINE SERVICE P.B.X CONNECTOR

Filed April 17, 1956 2 Sheets-Sheet 1

INVENTOR.
James S. Murray
BY McWatters Owen
Atty.

Jan. 19, 1960 J. S. MURRAY 2,921,985

COMBINED LINE SERVICE P.B.X CONNECTOR

Filed April 17, 1956 2 Sheets-Sheet 2

INVENTOR.
James S. Murray
BY McWatters Owen
Atty.

2,921,985

COMBINED LINE SERVICE P.B.X CONNECTOR

James S. Murray, Tampa, Fla., assignor to General Telephone Laboratories, Incorporated, a corporation of Delaware Application April 17, 1956, Serial No. 578,657

13 Claims. (Cl. 179—18)

The present invention relates in general to switches for telephone systems and is more particularly concerned with connector switches in such systems.

It is generally well-known that a P.B.X connector may have a group of trunks (or lines, as the case may be) on one level, all capable of being called by the dialling of one particular digit, in response to which the switch wipers are moved into engagement with the first trunk of said group. If said first trunk is idle, it will be seized in the usual manner. If said first trunk is busy the switch wipers are moved automatically over the succeeding trunks of said group until either an idle trunk is found, in which case it will be seized, or until the last trunk of said group is engaged by the wipers, in which case, no further automatic movement of the switch wipers will occur. If the last trunk of said group is idle, it will be seized by the switch but if said trunk is busy, busy tone will be returned to the calling subscriber.

In order to initiate automatic trunk hunting when the first trunk of a P.B.X group is engaged by the wipers in response to digital impulses, and in order to prevent further automatic trunk hunting beyond the last trunk of said group it is necessary to mark the first and last trunks of that group. One way of marking those trunks is to provide a circuit strap, or connection, between the control and extra control bank contacts associated with the first and last trunks of the particular P.B.X group. In this way, automatic trunk hunting beyond the connected contacts is precluded.

Figure 1:
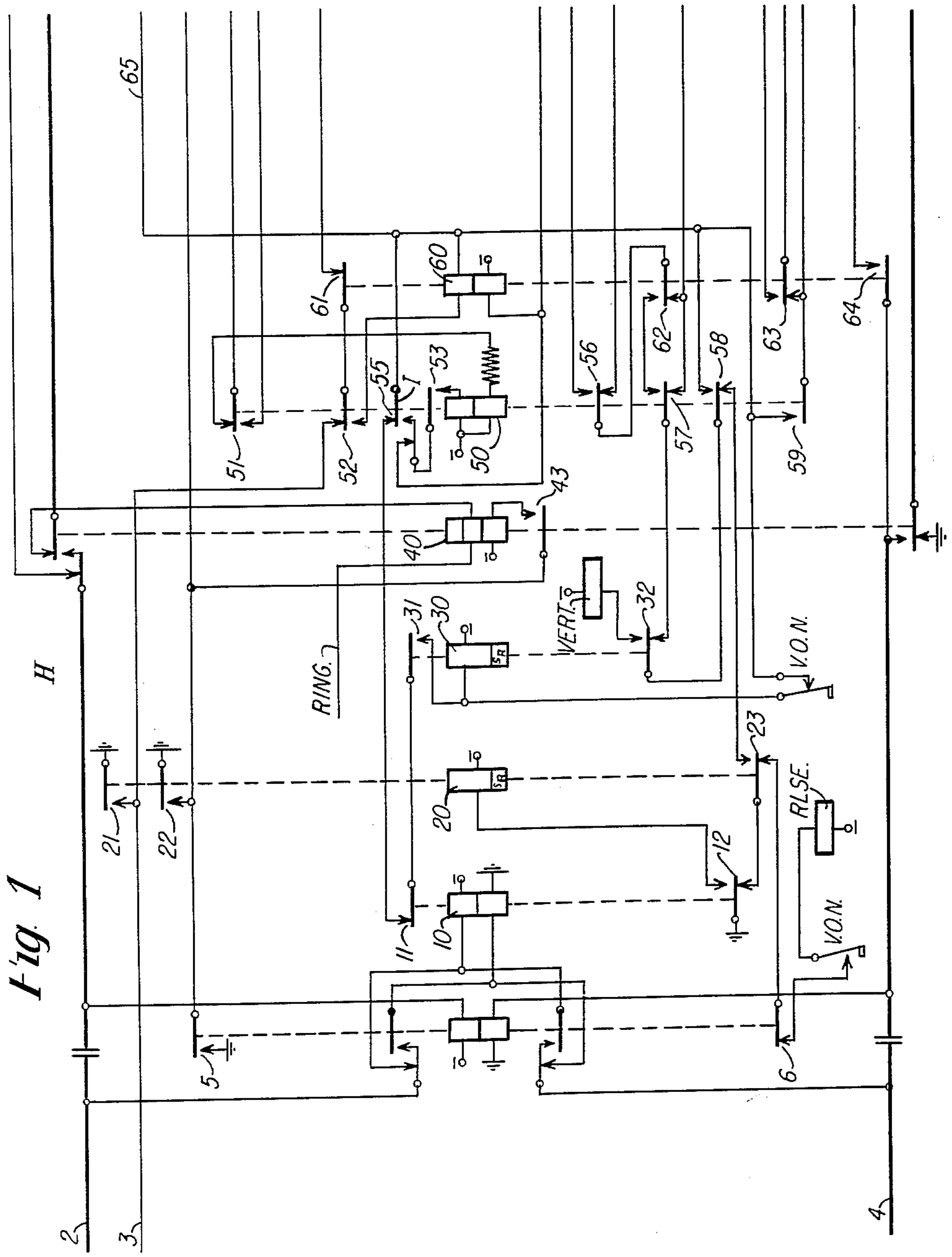
Figure 2:
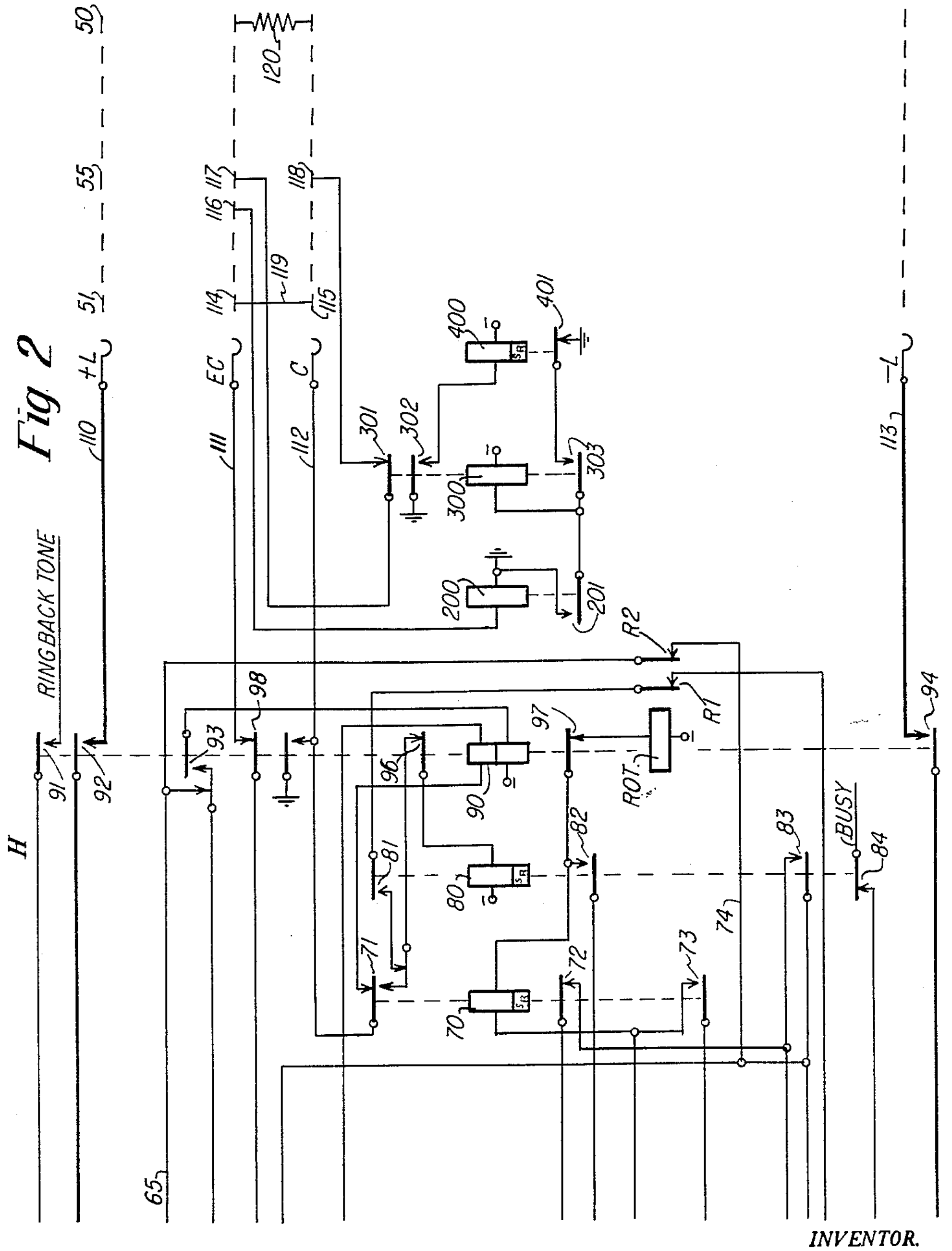

For the purpose of illustration it will be assumed that a P.B.X subscribed has been assigned the last six trunks in the fifth level of the connector shown in Figures 1 and 2. The P.B.X directory number will then be 55, and a strap connection is placed between the control and extra control contacts associated with trunk 55 in order to initiate automatic trunk hunting when the directory number 55 is dialled by a calling subscriber. The P.B.X subscriber, upon finding a need for additional trunks, but at the same time desiring to insure that he will continue to be reached when the directory number 55 is dialled by a calling subscriber, may be assigned the additional trunks 51, 52, 53 and 54. The P.B.X call number for these additional trunks will be 51 and the control and extra control contacts associated with trunk 51 must be connectively strapped also. It thus appears that if a calling subscriber is to have access to all ten of the P.B.X trunks, it is necessary that the strap connection between the control and extra control contacts associated with trunk 55 be opened when, and only when, 51 is dialled. By the same token, if a subscriber dials the directory number 55, it is necessary that the strap connection associated with trunk 55 be effective so that all of the succeeding trunks will be available if that trunk is busy.

The main object of the present invention is to provide a convenient means for assignment of an additional P.B.X group of trunks immediately preceding an already existing P.B.X group, to thereby allow a subscriber dialling the new group, full access to all of the trunks of both groups and at the same time to retain the directory number of the original P.B.X group so that all the trunks of that group will be available to a subscriber dialing the directory number.

The present disclosure is necessarily based upon the fact that the dialled rotary movement of the wipers of a connector switch is slower than the automatic rotary movement. By reason of this fact, when the directory number 55 is dialled into the connector, the strap connection associated with trunk 55 is opened when the wipers reach trunk 54 as they are stepped in response to dialled impulses but is re-established before the wipers reach trunk 55. On the other hand, when 51 is dialled and automatic rotary movement occurs, the strap connection is opened when the wipers reach trunk 54, but because of the faster movement of the wipers during automatic trunk hunting, the wipers pass over trunk 55 before the strap connection is re-established, thereby permitting further automatic trunk hunting.

Figures 1 and 2 together show a P.B.X connector switch and the fifth level of the connector bank terminals of said switch. The P.B.X connector therein shown is of the well-known Strowger vertical and rotary type and is a modification of the connector switch disclosed in the V. S. Tharp Patent 1,767,719, of June 24, 1930.

When the connector H is seized by a preceding selector, relay 10 is operated over conductors 2 and 4. Relay 20 is energized from ground at armature 12. Relay 30 is then energized from ground at armature 22. These relays will hold operated until the first digit is dialled.

For the purpose of illustration it will be assumed that the last six trunks of the fifth level of the connector switch from a P.B.X group and that the directory number for such group is 55. It will further be assumed that the first four trunks of the fifth level have just been added to the previously existing group. The new call number for these additional four trunks is 51 and that number, not appearing in the directory is known to only those persons who have been so informed by the P.B.X subscriber.

It will first be assumed that the number 51 is dialled into the connector H.

When the first digit 5 is dialled, the circuit to the vertical magnet VERT will be opened and closed five times from the ground at armature 12. The switch wipers will thus be stepped to the fifth vertical level of the connector bank. On the first vertical step of the wipers the vertical off normal springs, V.O.N., operate. At the termination of the first series of impulses, relay 30 restores and at armature 32, a circuit is prepared for the operation of the rotary magnet.

When the second digit 1 is dialled, the ground at armature 12 will cause the rotary magnet ROT to operate and move the wipers onto the first rotary contact of the fifth level. The rotary magnet ROT and relay 70 are energized in series over the following path: ground at armature 12, armatures 23, 58, 32, 57, 62 and 56, through the winding of relay 70, through armature 97 to the rotary magnet and battery. At armature 71, the C wiper conductor 112 is connected to the busy test relay 80. If the dialled trunk is idle, battery potential will be present at contact 115 from the cut off relay (not shown) of the called party's line equipment. When relay 70 restores, a circuit will be completed by way of armature 71 through the upper winding of relay 90 from the above-mentioned battery of the cut off relay, through the wiper of conductor 112 and the upper winding of relay 90 to ground at armature 21. At armatures 92 and 94 the ringing circuit is closed to the telephone of the called party. When the called party removes his handset in response to the ringing, the talking conductors 2 and 4 will be switched through to the called party's line in a well-known manner.

If the dialled trunk is busy, ground potential will be present on contacts 114 and 115. The ground on contact 115 will be returned over conductor 112 to the busy test relay 80 by way of operated armature 71. Relay 80 operates and prepares a locking circuit for itself at armature 81. At armature 82, a circuit to the rotary magnet is prepared. The ground on contact 114 is returned by the EC wiper of conductor 111 to the lower winding of relay 50 and battery. Relay 50 is a two step relay and operates armature 55 in a first step only. When relay 70 restores, relay 50 operates completely in a second step over its upper winding to ground at armature 22. Relay 50 then locks up by way of armatures 53 and 93 to ground at armature 22. At armatures 56, 57, and 58 the circuit to the rotary magnet ROT is further prepared. In its second step, relay 60 operates in parallel with relay 50 and at armature 62 completes the circuit to the rotary magnet. The rotary magnet then operates and steps the wipers to the next trunk of the P.B.X group. When the rotary magnet operates, the interrupter springs R2 break the circuit to relay 60 and relay 60 restores. At 62 the circuit to the rotary magnet is broken and the rotary magnet restores. The rotary magnet interrupter springs R2, again close the circuit to relay 60 and at armature 62 the circuit to the rotary magnet is closed and the rotary magnet again operates. This operation will continue until an idle trunk is found or until another strap connection is encountered between the C and EC contacts.

If an idle trunk is found, and relay 60 restores, armature 61 completes the operating circuit to relay 90. Relay 90 will switch through conductors 2 and 4 as heretofore described. It should be pointed out that relay 60 will not operate through its upper winding in series with relay 90.

When the wipers move into engagement with the EC contact 116 associated with trunk 54 and assuming that the trunk is idle, relay 200 will then operate over the path: battery, through the lower winding of relay 60, unoperated armature 72, operated armatures 83 and 51, through the EC wiper of conductor 111, through relay 200 to ground. Relay 200 will then operate but because of its high resistance winding, relay 60 will not operate in series with it. Relay 200 upon operating, closes the circuit to relay 300 from ground at 201. Relay 300 then operates and opens the strap connection between contacts 117 and 118 at 301 and at the same time completes the circuit to relay 400 and a holding circuit for itself at armatures 302 and 303 respectively. When relay 400 operates, the holding circuit for relay 300 is opened at 401 but relay 300 will remain operated over its alternate holding circuit to ground through operated armature 201. Relay 200 will not restore until relay 90 operates to switch through the call in the usual manner. When relay 90 operates, the circuit to relay 200 is opened at 98 and when relay 200 restores, relay 300 will restore immediately and relay 400 will restore shortly thereafter.

If trunk 54 is busy, relays 200, 300 and 400 will operate to open the strap connection between contacts 117 and 118 as described above. When the rotary magnet is again energized by the operation of relay 60 at armature 62, the EC wiper conductor 111 will step off of contact 116, thereby opening the circuit to relay 200. When the C wiper conductor 112 engages contact with 118 and ground is encountered, indicating that that trunk (55 in this case) is busy, then the switch wipers will automatically be moved to the next trunk. The automatic rotary movement of the switch is of sufficient speed to move the switch wipers off the contacts 117 and 118 associated with trunk 55 before the strap connection between these contacts is re-established by the restoration of relay 300. Thus the remaining trunks of the P.B.X group are available to the calling subscriber. If no idle trunk is found in the dialled P.B.X group the wipers will continue to step until the last trunk of the level is reached. At this time, the presence of the resistance in the strap connection 120 will prevent any further automatic movement of the switch wipers even though the last trunk is busy. It should be remembered that during the automatic rotary stepping of the switch, relay 60 is intermittently energized and deenergized because of the rotary interrupter springs R2.

If busy ground is encountered on the C contact of the last trunk this ground will be extended to the EC contact by way of strap connection 120. This ground will then be returned by way of the EC wiper conductor 111, operated armatures 51 and 63, unoperated armature 72 to relay 60 and battery. Relay 60 will now remain operated over this circuit independent of the rotary interrupter springs R2. At armature 62 the rotary magnet will be held operated. The circuit for relay 80 is opened at R1 and when relay 80 restores, the circuit to the rotary magnet will be opened at 82. At armature 84, busy tone will be returned to the calling party.

If trunk 55 had been idle, it would have been seized by the operation of relay 90 as before described. In this case relay 200 would restore thereby restoring relays 300 and 400 as heretofore set out.

The operation of the switch will now be described when the number 55 is dialled into the connector.

When the first digit 5 is dialled, the switch wipers will be stepped vertically to the fifth level of the connector bank contacts as hereinbefore described.

When the second digit 5 is dialled the switch wipers are stepped to the fifth trunk of the level in the manner described hereafter. In response to the first dial pulse of the second digit, the wipers will step onto the first trunk and if this trunk is busy, ground will be returned to the lower winding of relay 50 to battery. Only the I contacts 55 will be operated, responsive to relay 50 being energized over this winding. Relay 50 will not operate completely when the I contacts operate because the slow-to-release relay 70 remains operated and thereby opens the operating circuit to relay 50 at armature 72.

In response to the remaining dial impulses the switch wipers will step over the EC contact 116 associated with trunk 54 and onto the connectively strapped contacts 117 and 118 associated with trunk 55.

When the EC wiper 111, comes into engagement with contact 116, relays 200, 300 and 400 will operate to open the strap connection between contacts 117 and 118. If 55 is dialled, as is the assumed case here, and if the calling subscriber is to have access to the remaining trunks of the dialled P.B.X group, it is necessary that the strap connection between contacts 117 and 118 be effective when the EC and C switch wipers of conductors 111 and 112 are resting on those contacts.

It is well-known that the rotary movement of the switch wipers in response to dialled impulses is slower than the automatic rotary movement of said wipers. Because of this fact, when the switch wipers are moved off of the EC contact 116, relay 200 will restore and cause the relays 300 and 400 to restore Before the wipers are moved off the connectively strapped contacts 117 and 118. In this way, automatic trunk hunting will be initiated and all of the remaining trunks in the P.B.X group will be available to the calling subscriber.

A P.B.X group may be so set up that each set of connector bank contacts of the group is extended directly to a particular telephone and in that case a calling subscriber may wish to call only a particular telephone in said group. It will be assumed then, that a calling subscriber wishes to call a particular line in the P.B.X group and that the directory number of said line is 50.

The switch wipers will be stepped vertically to the fifth level of the connector bank contacts as before. When the second digit 0 is dialled, the switch wipers will be rotated to the tenth contact of the fifth level. In this case, when contact 116 is engaged by the switch wipers, the relays 200, 300 and 400 will operate to open the strap connection between contacts 117 and 118 as before. Because the switch wipers are being stepped in response to digital impulses the strap connection between contacts 117 and 118 will be re-established by the restoration of relay 300 before the switch wipers are stepped off of said contacts in the same manner as was described above when the number 55 was dialled. In the present case however, the strap connection between contacts 117 and 118 will not prevent the further movement of the switch wipers because of the fact that relay 70 is held operated during the dialled rotary movement of the switch wipers and at armature 72, the operating circuit for relay 50 is held open.

The wipers will now be stepped in a rotary motion over the succeeding contacts of the fifth level to the tenth rotary contact. If the called line is idle, battery from the cut off relay (not shown) of the called party's line equipment will cause the operation of relay 90 and switch through the talking conductors as before described.

If the called line is busy, ground potential will be present on the C lead of the tenth rotary contact. This ground will be returned to the busy test relay 80 by way of armature 71. Relay 80 operates and in so doing prepares a locking circuit for itself and opens the circuit to the busy tone equipment at 84. When slow-to-release relay 70 restores, a circuit is completed for the operation of relay 60 through its lower winding to ground at armature 22. When relay 60 operates, the circuit to relay 80 is broken at 63 and relay 80 restores and closes the circuit to the busy tone equipment which now operates to return busy tone to the calling subscriber.

The resistance strap connection 120, between the C and EC tenth rotary contacts is provided not only to prevent automatic rotary movement beyond the last trunk as was described above, but also to prevent the switch from starting to automatically search for an idle trunk when the last trunk is dialled and is busy. The resistance provided is of a value such that the I contacts 55, of relay 50, will not operate from the ground on the C lead. By preventing the operation of relay 50, automatic trunk hunting is prevented as the circuit to the rotary magnet is broken at unoperated armatures 56 and 57 of relay 50. At this time relay 80 will restore and busy tone will be returned to the calling subscriber.

At this point, it should be mentioned that although Figs. 1 and 2 show only one P.B.X connector, relays 200, 300, and 400 and their related contacts are common to a whole group of such connectors. This is true because each of the bank contacts of the P.B.X connector switch shown in Figs. 1 and 2 are multipled to the corresponding contacts of every other switch in that group in the usual well-known manner.

What has been herein described is at present considered to be the preferred embodiment of this invention but it will be understood that said embodiment is given by way of example and that modifications may be made in the structure and organization of this invention without departing from the true spirit and scope thereof.

What is claimed is:

1. In a trunk hunting connector, groups of subscribers' trunks, said groups divided into sub-groups, marking means for marking the first trunk of each sub-group, a set of switch wipers having access to said sub-groups, means in said connector responsive to the receipt of digital impulses for moving said wipers into contact with the first trunk of any one of said sub-groups, said marking means effective to automatically move said switch wipers into engagement with the succeeding trunks of a selected sub-group in case said first trunk of said sub-group is busy, said marking means normally effective to prevent further automatic movement of said switch wipers when the first trunk of a succeeding sub-group is engaged by the said switch wipers after an automatic movement thereof, means in said connector responsive to the receipt of a first predetermined digit for moving said switch wipers to the first trunk of a first one of said sub-groups of a group, and means in said connector for removing said marking means from the first trunk of the succeeding sub-group, to thereby permit further automatic movement of said switch wipers over the trunks of the second sub-group.

2. In a trunk hunting connector as set out in claim 1, means in said connector responsive to the receipt of a different predetermined digit for moving said switch wipers to the first trunk of said succeeding sub-group, and means for, in this instance, retaining said marking means on said first trunk to permit further automatic movement of said switch wipers.

3. In a trunk hunting connector as set out in claim 1, means for restoring said marking to said first trunk of said succeeding group subsequent to the time when said marking would be effective to prevent further automatic movement of said switch wipers.

4. In a trunk hunting connector as set out in claim 1, means responsive to the receipt of a different predetermined digit for moving said switch wipers to the first trunk of said succeeding sub-group, and means for, in this instance, restoring said marking to said first trunk of said succeeding sub-group prior to the time when said marking would be effective to prevent further automatic movement of said switch wipers.

5. In a trunk hunting connector, a group of subscribers trunks, said group divided into sub-groups, a set of switch wipers having access to said sub-groups, means for marking the first trunk of each sub-group, said marking on said first trunk of each sub-group effective to automatically move said switch wipers over succeeding trunks in case said first trunk of said sub-group is busy, means associated with the trunk immediately preceding the first trunk of said succeeding sub-group for removing said marking from said first trunk when said switch wipers come into engagement with said immediately preceding trunk, means for restoring said marking to said first trunk subsequent to the disengagement of said switch wipers from said immediately preceding trunk, and means responsive to said automatic movement of said switch wipers for stepping said switch wipers across said first trunk of said succeeding sub-group prior to the time when said marking on said first trunk is restored.

6. In a trunk hunting connector, a group of subscribers trunks, said group divided into sub-groups, a set of switch wipers having access to said sub-groups, means for marking the first trunk of each sub-group, means in said connector responsive to the receipt of digital impulses for moving said switch wipers into engagement with the first trunk of any of said sub-groups, means for removing said marking from the first trunk of the selected sub-group in case said switch wipers come into engagement with the last trunk of an immediately preceding sub-group, means for restoring said marking to said first contact of said selected sub-group prior to the engagement of said switch wipers with said first contact of said selected sub-group.

7. In a trunk hunting connector switch, a group of trunks in a particular level of said switch, test conductors for each trunk of said group, a set of switch wipers having access to said group a similar marking on the first and last trunks of said group, the marking on the first trunk of said group effective to cause said switch wipers to automatically rotate over the remaining trunks of said group and the marking on the last trunk of said group effective to cause said switch wipers to stop and return a busy signal in case said last trunk is busy, a similar marking on one of the trunks in said level preceding said group for causing said switch wipers to rotate automatically in case said switch wipers are operated to said preceding trunk, and means effective to remove the marking on said first trunk of said group before said switch wipers rotate into engagement therewith.

8. In a trunk hunting connector switch as claimed in claim 7, means for restoring said marking to said first trunk of said group after it has been tested by said switch wipers.

9. In a trunk hunting connector switch, a group of subscribers trunks divided into first and second sub-groups, a first and second control contact for each trunk of said group, said switch including a set of wipers having access to said contacts of each of said trunks, circuit connection means for connecting together the said first and second control contacts of the first trunk of each of said sub-groups, a first relay connected to the first control contact of the last trunk of said first sub-group, means responsive to the receipt of digital impulses by said switch for moving said wipers into engagement with the said control contacts of the first trunk of said first sub-group, said circuit connection therebetween being effective to cause the operation of said switch to move said wipers to automatically test succeeding trunks until said wipers engage an idle trunk or until said wipers engage the connected first and second control contacts of said second sub-group, circuit means for operating said first relay in response to said wipers engaging said last control contacts of said trunk of said first sub-group, a second relay, and means responsive to the operation of said first relay for operating said second relay, means operated by said second relay for opening said connection between said control contacts corresponding to the first trunk of said second sub-group in order to permit subsequent operation of said switch to rotate said wipers and automatically test the succeeding trunks therein.

10. In a trunk hunting connector switch as claimed in claim 9, wherein said first and second control contacts are multipled to the corresponding control contacts of a plurality of other trunk hunting connectors, and said first and second relays are common to all of said trunk hunting connectors.

11. In a trunk hunting connector switch as claimed in claim 9, circuit means including a third relay effective to cause said second relay to restore responsive to the disengagement of said wipers from said last trunk of said first sub-group, thereby re-establishing said circuit connection between said first and second control contacts of the first trunk of said second sub-group.

12. In a trunk hunting connector switch as claimed in claim 10, wherein said circuit connection is re-established between said contacts only after said trunk has been tested by said switch.

13. In a trunk hunting connector switch as claimed in claim 11, including means responsive to the receipt of digital impulses by said switch for moving said wipers into engagement with the first trunk of said second sub-group, and means for, in this instance, causing said second relay to restore, whereby said circuit connection is re-established between said control contacts of the dialled trunk before said trunk has been tested by said switch, thereby initiating automatic operation of said switch to move said wipers over the succeeding trunks of said second sub-group until an idle trunk is found.

References Cited in the file of this patent

UNITED STATES PATENTS 1,436,261 Jacobsen -------------- Nov. 21, 1922